US008270551B2

(12) United States Patent
De Vries et al.

(10) Patent No.: US 8,270,551 B2
(45) Date of Patent: Sep. 18, 2012

(54) METHOD FOR THE RAPID SYNCHRONISATION OF A DEVICE FOR RECEIVING SCRAMBLED DATA, USING AN OPTIMISED CALCULATION OF A SYNCHRONISATION VALUE

(75) Inventors: Maarten De Vries, Paris (FR); Samir Dechicha, Paris (FR)

(73) Assignee: Wavecom, Issy les Moulineaux (FR)

( * ) Notice: Subject to any disclaimer, the term of this patent is extended or adjusted under 35 U.S.C. 154(b) by 1022 days.

(21) Appl. No.: 11/547,220

(22) PCT Filed: Mar. 10, 2005

(86) PCT No.: PCT/FR2005/000580
§ 371 (c)(1),
(2), (4) Date: Sep. 25, 2008

(87) PCT Pub. No.: WO2005/107091
PCT Pub. Date: Nov. 10, 2005

(65) Prior Publication Data
US 2009/0010431 A1   Jan. 8, 2009

(30) Foreign Application Priority Data

Mar. 31, 2004   (FR) ..................................... 04 03393

(51) Int. Cl.
*H04L 7/00* (2006.01)
(52) U.S. Cl. ...................................................... 375/354
(58) Field of Classification Search .................. 375/316, 375/354
See application file for complete search history.

(56) References Cited

U.S. PATENT DOCUMENTS 6,173,009 B1 *    1/2001    Gu ................................. 375/150
2003/0134597 A1 *    7/2003    Rao et al. ......................... 455/63

OTHER PUBLICATIONS

Universal Mobile Telecommunications System (UMTS); Spreading and Modulation (FDD) (3GPP TS 25.213 version 4.2.0 Release 4) ETSI Standards, European Telecommunication Standards Institute, Sophia-Antipo, FR, vol. 3-RI, No. V420, Dec. 2001.*
"Universal Mobile Telecommunications System (UMTS); Spreading and Modulation (FDD) (3GPP TS 25.213 version 4.2.0 Release 4)", ETSI Standards, European Telecommunications Standards Institute, Sophia-Antipo, FR, vol. 3-R1, No. V420, Dec. 2001, XP014008385 ISSN:0000-0001 cited in the application. Section 5.2.2. pp. 1-26.

* cited by examiner

*Primary Examiner* — Kevin M Burd
(74) *Attorney, Agent, or Firm* — David D. Brush; Westman, Champlin & Kelly, P.A.

(57) ABSTRACT

The disclosure relates to a method of synchronising a device for receiving scrambled data, using at least one periodic scrambling sequence which is divided into K time intervals, each interval comprising N bit periods known as symbols. In particular, one such method includes calculating a synchronisation value of at least one polynomial that generates the aforementioned scrambling sequence within a pre-determined synchronisation time interval and synchronisation bit period. During the calculation step, the sequence is progressed through at increments of at least one time interval and at least one bit period, using a matrix calculation of the synchronisation value.

19 Claims, 5 Drawing Sheets

METHOD FOR THE RAPID SYNCHRONISATION OF A DEVICE FOR RECEIVING SCRAMBLED DATA, USING AN OPTIMISED CALCULATION OF A SYNCHRONISATION VALUE

CROSS-REFERENCE TO RELATED APPLICATION

This application is a Section 371 National Stage Application of International Application No. PCT/FR2005/000580, filed Mar. 10, 2005 and published as WO 2005/107091 on Nov. 10, 2005, not in English.

FIELD OF THE DISCLOSURE

This disclosure relates to the minimisation of the synchronisation time necessary for a receiver, contained in particular in a terminal of a UMTS-type ("Universal Mobile Telecommunication System") mobile telephone system, to recover the synchronism between the sequences that it produces and the sequences transmitted by the base station.

BACKGROUND

Indeed, any message received by a mobile terminal is scrambled upon transmission and must therefore be descrambled by means of the same series of sequences as that initially generated by the transmitting base station. In addition, this descrambling must be performed in synchronism with the scrambling performed by the base station.

In the context of WCDMA ("Wideband Code-Division Multiple Access"), i.e. for one of the essential technologies necessary for implementation of the new generation (3G) of cellular systems, all of the data received is diffused and scrambled in the form of OVSF ("Orthogonal Variable Spreading Factor") scrambling sequences and of scrambling sequences. Each OVSF sequence is periodic at the level of the symbols (or bit period) that compose it, just as each scrambling sequence is also periodic at the level of the time intervals (frame) that segment it.

To recover the message transmitted in the form of a signal at the receiving terminal, it is therefore necessary to recover the synchronism, between the sequences produced by the receiving terminal and the OVSF and scrambling sequences, transmitted by the base station. If this synchronism is not achieved, the signal received then simply amounts to noise.

All of the aforementioned synchronisation constraints are particularly present in UMTS-type mobile telecommunications terminals, and more specifically in the following two essential elements included in such a mobile terminal:

the RAKE receiver, which includes, inter alia, the technical component responsible for control of the synchronisation, and in particular that associated with the CPICH ("Common Pilot Indicator Channel") pilot channel;

the cell detector, better known under the name "cell searcher", which functions according to at least the following three main steps:

step 1: search for the primary channel or "Primary Synchronisation Channel" (P-SCH);

step 2: synchronisation performed on the secondary channel, or "Secondary Synchronisation Channel" (S-SCH);

step 3: measurement of correlation on the common pilot indicator channel or CPICH.

We will now consider the hypothesis according to which the synchronisation time of the signal received is known, in other words the beginning of scrambling sequence is known. This information is available in particular from the "cell searcher" which delivers, in its operation steps one and two, the synchronisation sequences of the slot and frame time intervals for the signal received, completed by the multiple path detector (or "Multi-path searcher"), which delivers a phase synchronisation for each echo.

To demodulate the data of the signal received, it is thus necessary to initialise the scrambling code sequences and the OVSF sequences in a predetermined state, at a precise instant. When the scrambling sequence is known, the OVSF sequence to be used is provided by other channels of the protocol.

The problem presented, however, is that of knowing how to load the right value at the right time into the polynomial generating scrambling sequences.

However, as the operation of these two "Rake receiver" and "Cell searcher" elements consumes a relatively large amount of electrical energy during use of the terminal, they are alternatively turned on or off according to the receipt of messages, which requires finding the right synchronisation value for initialisation of the generator polynomial, at the right time, at each restart.

However, these successive shutdowns and restarts involve a notable convergence time for returning the generator polynomials "x" and "y" to the state that they occupied at the time of the shutdown, which confirms the benefit of providing an effective solution to the aforementioned problems.

1. Solutions of the Prior Art

Among the solutions of the prior art currently known, the most commonly used for attempting to optimise the convergence time to return the polynomials "x" and "y" to a predetermined specific state is the "slewing" technique. This technique is based on the fact that the receiver of a mobile telecommunications terminal comprises two periodic generators of bit sequences, identical to those of the base station. Thus, this terminal must first load the scrambling value into the generator of the in-phase channel, then recover the synchronism ("slewing").

Two cases can then occur according to the value of the known time shift between the sequences that it produces and those transmitted by the base station:

if it is late, i.e. if the sequences at the output of its generators precede the corresponding sequences of the scrambled message in the series of sequences, the receiver will have to time the two generators at a frequency greater than the frequency of reception (equal to 3.84 Mchips/s) of the sequence in order to catch the correct phase;

if it is ahead, i.e. if the sequences at the output of its generators appear after the corresponding sequences of the scrambled message in the series of sequences, the receiver will have to freeze the two generators (no clock signal), until it has reached the correct phase.

The "slewing" technique therefore amounts to accelerating or slowing (or even freezing) the generator polynomial so as to reach the desired state corresponding to an alignment of the data received.

Naturally, during the synchronisation delay necessary for the terminal to recover the synchronism, this terminal cannot descramble the message received, so it loses the information and expends energy unnecessarily. It is therefore important to minimise this synchronisation delay which is dependent on the processing time imposed by the "slewing" technique, which is generally on the order of a time interval of 2560 bits.

Very long periodic generators are generally used to produce sequences of pseudorandom bits. Such a generator is generally produced by means of a linear feedback shift register timed to the rhythm of a clock signal. The sequence bits generated correspond to the outputs of the flip-flops of the register.

A typical application of the periodic generator is scrambling. For clarification, reference can be made to the transmission mode used in the UMTS ("Universal Mobile Telecommunication System") mobile communications system.

At the level of a base station, a message to be transmitted is modulated on two channels, the phase I channel and the quadrature Q channel. Each of the channels I and Q is scrambled by means of a system of two generators ("x" and "y"), although the state of the generator X is offset with respect to the state of Y by a scrambling value characterising the base station. This scrambling value ("scrambling code") corresponds to a predetermined number of clock cycles. When the terminal is late, it is possible to adjust the frequency of the clock signal, which then makes it possible to perform clock jumps and thus to make up for the delay observed.

Consequently, each time the demodulator is on, it is caused to run idle until it converges, before beginning to demodulate. It then becomes necessary either to freeze or to accelerate the pseudorandom generators so as to compensate for their advancement or delay with respect to the frame of the signal received and thus enable them to be positioned at the state that they occupied at the time of the shutdown. A significant problem associated with this operating mode, however, relates to the fact that the convergence time is too high, which is generally close to the duration of a synchronisation time interval (frame). However, it currently appears to be impossible to dispense with such pseudorandom generators in order to initialise the registers at the right values and thus recover the synchronism between the bit sequences produced by the demodulator of the receiving terminal and the sequences transmitted by the base station.

A second solution known from the prior art for reducing this waiting time consists of skipping a predetermined number of sequences (generally called "immediate shift") to the periodic generators. However, this so-called "mask storage" solution significantly increases the complexity of the generators and the production cost of such devices in a manner that is not necessarily justified for a UMTS-type mobile telephone terminal.

2. Disadvantages of the Prior Art

A first disadvantage of these prior art techniques is that they impose a synchronisation delay that is sometimes significant but necessary for the terminal to recover the synchronism, which terminal is incapable of directly descrambling the message received, resulting in a possible loss of information and unnecessary energy expenditures.

A second major disadvantage associated with these prior art techniques is that they significantly increase the complexity of the generators to be implemented, which usually use hardware solutions, which may be unsuitable given the miniaturisation constraints of mobile radiocommunication terminals and the components that they integrate.

SUMMARY

An embodiment of the disclosure is directed to a method for synchronising a device for receiving scrambled data by means of at least one periodic scrambling sequence organised in K time intervals each including N bit periods called symbols. Such a method includes a step of calculating a synchronisation value of at least one pseudorandom generator of the scrambling sequence, in a predetermined synchronisation time interval and synchronisation bit period. It makes it possible in particular and advantageously, in a calculation step, to progress in the scrambling sequence by jumps of at least one time interval and at least one bit period, by implementing a matrix calculation of the synchronisation value.

The matrix calculation preferably implements a multiplication of an initialisation value of the pseudorandom generator by at least one predetermined transfer matrix. This technique is based on the fact that the pseudorandom generators of the receiver of a mobile telecommunications terminal, in particular of the UMTS-type, are periodic and comprised of bit sequences, identical to those of the base station. Thus, this terminal must first load the scrambling value into the "x" generator" before being capable of recovering the synchronism.

The method according to an embodiment of the invention advantageously makes it possible to progress in the bit sequence by jumps of at least one time interval, by calculating the value of the generator polynomial at the interval boundaries, until the synchronisation time interval is determined.

Also advantageously, the value of the pseudorandom generator at the time interval boundaries is determined from the initialisation value, by successive multiplications by a time interval transfer matrix.

Preferably, in the synchronisation time interval, progression is made in the sequence by jumps of at least one period of N bits, by calculating the value of the pseudorandom generator at the boundaries of the bit periods, until the value of the synchronisation bit period is obtained.

Advantageously, the value of the pseudorandom generator at the boundaries of the bit periods is determined from the value of the generator at the boundaries of the intervals, by successive multiplications by a bit period transfer matrix.

The benefit of such an approach advantageously lies in its capacity to promote the very rapid convergence of the pseudorandom generator(s) toward the synchronisation value. It indeed involves optimising the convergence time by first performing a first cutting of scrambling sequences by time intervals and a second cutting of these time intervals into bit periods or symbols, then performing the following steps leading to the synchronisation value:

as many time intervals are carried out as necessary until the predetermined time interval is reached, which is a component of the synchronisation value;

then, as many bit periods (or symbols) are carried out as necessary, so as to reach or be positioned at the symbol value.

This approach then makes it possible to turn the demodulator off and on again while eliminating any risk of electrical overconsumption, any risk of frame loss or any other constraint associated with the convergence time normally encountered with the solutions of the prior art. The frame loss is reduced to a maximum of two CPICH symbols.

The data is preferably scrambled according to at least two scrambling sequences X and Y, and the initialisation value for sequence Y is set. The initialisation value for sequence X is characteristic of a device for transmission of scrambled data.

The scrambling sequences X and Y are respectively obtained from the generator polynomials "x" and "y".

Advantageously, as the periodic scrambling sequence is organised into K time intervals each including N bit periods, the symbol transfer matrix for sequence X is the matrix $(M_X^K)^N$ and the time interval transfer matrix for said sequence X is the matrix $M_X^K$.

Preferably, as the periodic scrambling sequence is organised into K time intervals each including N bit periods, the symbol transfer matrix for sequence Y is the matrix $M_Y^N$ and the value of the generator polynomial at the boundaries of the intervals for sequence Y is determined from a table of vectors associated with the generator polynomial of sequence Y.

Also, advantageously, to reach the index phase vector $(\beta+\mu)$ from the index phase vector $\beta$ of the scrambling sequence by successive jumps of value i, at least the following steps are performed:

decomposition of the index value $\mu$ in the form of a sum of the quotient and the remainder r of the Euclidian division of $\mu$ by i, the quotient then being expressed in the form of a product of an integer j with the jump value i;

elevation of the integer power j of the time interval transfer matrix of sequence X, the time interval including ranges of i bit periods;

multiplication of the index phase vector $\beta$ by the time interval transfer matrix $(M_X^i)^j$, so as to obtain the value of the index phase vector $(\beta+i\times j)$, then;

multiplication of the index phase vector $(\beta+i\times j)$ by the bit period transfer matrix $(M_X^r)$, so as to be positioned on the right bit period value.

The series of these various steps advantageously makes it possible to limit, to a value of $(j+r)$, the number of clock cycles to be applied in order to reach the desired phase vector, which is also particularly advantageous in the context of an "accelerated slewing" application.

Preferably, the successive bit period jumps have a value expressed in the form of a power of two, these bits being capable of having only two values: zero or one. The Euclidian division of $\mu$ by i then becomes very simple to perform.

Preferably, the synchronisation process implements the UMTS ("Universal Mobile Telecommunications System") standard, with the bit periods being CPICH ("Common Pilot Indicator Channel") symbols.

The receiving device advantageously includes at least one RAKE receiver and cell searching means of the cell searcher-type.

In the context of a UMTS network, the Rake receiver includes the component of the mobile terminal responsible for the control associated with the synchronisation. Upon start-up, it receives in particular a starting or initialisation point, from which it performs the control of the schedule for receiving the data received. The Rake receiver therefore has a dual function, a first control of the synchronisation relative to the CPICH pilot channel, and a second control relative to the synchronisation of the data received.

The cell searcher of a UMTS mobile terminal, when it is turned on, performs the following three steps:

step 1: search for the strongest transmitting station;

step 2: determination of the primary channel or P-SCH ("Primary Synchronisation Channel");

step 3: synchronisation on the secondary channel or S-SCH ("Secondary Synchronisation Channel").

It is from these last two steps in particular that the cell searcher is capable of delivering the frame and slot time interval starting coordinates corresponding to the strongest transmitting station.

Advantageously, as the bit periods are CPICH symbols, each of the time intervals includes K=10 periods of N=256 bits, so as to obtain a finer granularity.

Thus, advantageously, the bit period transfer matrix for sequence X is the matrix:

$$Mx^{256} = \begin{pmatrix} 0 & 0 & 0 & 1 & 1 & 0 & 0 & 1 & 1 & 0 & 0 & 0 & 0 & 0 & 0 & 0 & 0 & 0 \\ 0 & 0 & 0 & 0 & 1 & 1 & 0 & 0 & 1 & 1 & 0 & 0 & 0 & 0 & 0 & 0 & 0 & 0 \\ 0 & 0 & 0 & 0 & 0 & 1 & 1 & 0 & 0 & 1 & 1 & 0 & 0 & 0 & 0 & 0 & 0 & 0 \\ 0 & 0 & 0 & 0 & 0 & 0 & 1 & 1 & 0 & 0 & 1 & 1 & 0 & 0 & 0 & 0 & 0 & 0 \\ 0 & 0 & 0 & 0 & 0 & 0 & 0 & 1 & 1 & 0 & 0 & 1 & 1 & 0 & 0 & 0 & 0 & 0 \\ 0 & 0 & 0 & 0 & 0 & 0 & 0 & 0 & 1 & 1 & 0 & 0 & 1 & 1 & 0 & 0 & 0 & 0 \\ 0 & 0 & 0 & 0 & 0 & 0 & 0 & 0 & 0 & 1 & 1 & 0 & 0 & 1 & 1 & 0 & 0 & 0 \\ 0 & 0 & 0 & 0 & 0 & 0 & 0 & 0 & 0 & 0 & 1 & 1 & 0 & 0 & 1 & 1 & 0 & 0 \\ 0 & 0 & 0 & 0 & 0 & 0 & 0 & 0 & 0 & 0 & 0 & 1 & 1 & 0 & 0 & 1 & 1 & 0 \\ 0 & 0 & 0 & 0 & 0 & 0 & 0 & 0 & 0 & 0 & 0 & 0 & 1 & 1 & 0 & 0 & 1 & 1 \\ 1 & 0 & 0 & 0 & 0 & 0 & 0 & 1 & 0 & 0 & 0 & 0 & 0 & 1 & 1 & 0 & 0 & 1 \\ 1 & 1 & 0 & 0 & 0 & 0 & 0 & 1 & 1 & 0 & 0 & 0 & 0 & 0 & 1 & 1 & 0 & 0 \\ 0 & 1 & 1 & 0 & 0 & 0 & 0 & 0 & 1 & 1 & 0 & 0 & 0 & 0 & 0 & 1 & 1 & 0 \\ 0 & 0 & 1 & 1 & 0 & 0 & 0 & 0 & 0 & 1 & 1 & 0 & 0 & 0 & 0 & 0 & 1 & 1 \\ 1 & 0 & 0 & 1 & 1 & 0 & 0 & 1 & 0 & 0 & 1 & 1 & 0 & 0 & 0 & 0 & 0 & 1 \\ 1 & 1 & 0 & 0 & 1 & 1 & 0 & 1 & 1 & 0 & 0 & 1 & 1 & 0 & 0 & 0 & 0 & 0 \\ 0 & 1 & 1 & 0 & 0 & 1 & 1 & 0 & 1 & 1 & 0 & 0 & 1 & 1 & 0 & 0 & 0 & 0 \\ 0 & 0 & 1 & 1 & 0 & 0 & 1 & 1 & 0 & 1 & 1 & 0 & 0 & 1 & 1 & 0 & 0 & 0 \end{pmatrix}$$

which can also be written in the form:

$X0,n+1=X3,n\hat{}X4,n\hat{}X7,n\hat{}X8,n$ to $X17,n+1=X2,n\hat{}X3,n\hat{}X6,n\hat{}X7,n\hat{}X9,n\hat{}X10,n\hat{}X13,n\hat{}X14,n$ Also advantageously, the time interval transfer matrix for sequence X is the matrix:

$Mx^{2560} =$ $$\begin{pmatrix} 0 & 1 & 1 & 1 & 1 & 1 & 1 & 0 & 1 & 1 & 0 & 1 & 1 & 0 & 0 & 1 & 1 \\ 1 & 0 & 1 & 1 & 1 & 1 & 1 & 0 & 1 & 0 & 1 & 1 & 0 & 1 & 1 & 0 & 0 & 1 \\ 1 & 1 & 0 & 1 & 1 & 1 & 1 & 0 & 0 & 1 & 0 & 1 & 1 & 0 & 1 & 1 & 0 & 0 \\ 0 & 1 & 1 & 0 & 1 & 1 & 1 & 1 & 0 & 0 & 1 & 0 & 1 & 1 & 0 & 1 & 1 & 0 \\ 0 & 0 & 1 & 1 & 0 & 1 & 1 & 1 & 1 & 0 & 0 & 1 & 0 & 1 & 1 & 0 & 1 & 1 \\ 1 & 0 & 0 & 1 & 1 & 0 & 1 & 0 & 1 & 1 & 0 & 0 & 1 & 0 & 1 & 1 & 0 & 1 \\ 1 & 1 & 0 & 0 & 1 & 1 & 0 & 0 & 0 & 1 & 1 & 0 & 0 & 1 & 0 & 1 & 1 & 0 \\ 0 & 1 & 1 & 0 & 0 & 1 & 1 & 0 & 0 & 0 & 1 & 1 & 0 & 0 & 1 & 0 & 1 & 1 \\ 1 & 0 & 1 & 1 & 0 & 0 & 1 & 0 & 0 & 0 & 0 & 1 & 1 & 0 & 0 & 1 & 0 & 1 \\ 1 & 1 & 0 & 1 & 1 & 0 & 0 & 0 & 0 & 0 & 0 & 0 & 1 & 1 & 0 & 0 & 1 & 0 \\ 0 & 1 & 1 & 0 & 1 & 1 & 0 & 0 & 0 & 0 & 0 & 0 & 0 & 1 & 1 & 0 & 0 & 1 \\ 1 & 0 & 1 & 1 & 0 & 1 & 1 & 1 & 0 & 0 & 0 & 0 & 0 & 0 & 1 & 1 & 0 & 0 \\ 0 & 1 & 0 & 1 & 1 & 0 & 1 & 1 & 1 & 0 & 0 & 0 & 0 & 0 & 0 & 1 & 1 & 0 \\ 0 & 0 & 1 & 0 & 1 & 1 & 0 & 1 & 1 & 1 & 0 & 0 & 0 & 0 & 0 & 0 & 1 & 1 \\ 1 & 0 & 0 & 1 & 0 & 1 & 1 & 1 & 1 & 1 & 0 & 0 & 0 & 0 & 0 & 0 & 0 & 1 \\ 1 & 1 & 0 & 0 & 1 & 0 & 1 & 0 & 1 & 1 & 1 & 1 & 0 & 0 & 0 & 0 & 0 & 0 \\ 0 & 1 & 1 & 0 & 0 & 1 & 0 & 1 & 0 & 1 & 1 & 1 & 1 & 0 & 0 & 0 & 0 & 0 \\ 0 & 0 & 1 & 1 & 0 & 0 & 1 & 0 & 1 & 0 & 1 & 1 & 1 & 1 & 0 & 0 & 0 & 0 \end{pmatrix}$$

which can also be written in the form:

$X0,n+1=X1,n\hat{}X2,n\hat{}X3,n\hat{}X4,n\hat{}X5,n\hat{}X6,n\hat{}X7,n\hat{}X9,n\hat{}X10,n\hat{}X12,n\hat{}X13,n\hat{}X16,n\hat{}X17,n$ to $X17,n+1=X2,n\hat{}X3,n\hat{}X6,n\hat{}X8,n\hat{}X10,n\hat{}X11,n\hat{}X12,n\hat{}X13,n$ said bit period transfer matrix for said sequence Y then being the matrix:

$X17, n+1 = X2, n\^X3, n\^X6, n\^X7, n\^X9, n\^X10, n\^X13, n\^X14, n$ $$My^{256} = \begin{pmatrix} 1 & 1 & 1 & 0 & 1 & 0 & 1 & 1 & 1 & 0 & 0 & 0 & 0 & 1 & 0 & 1 & 1 \\ 1 & 1 & 1 & 1 & 0 & 0 & 0 & 0 & 1 & 1 & 1 & 0 & 0 & 0 & 0 & 1 & 0 & 1 \\ 1 & 1 & 1 & 1 & 1 & 1 & 0 & 1 & 0 & 1 & 0 & 1 & 0 & 0 & 0 & 0 & 1 & 0 \\ 0 & 1 & 1 & 1 & 1 & 1 & 1 & 0 & 1 & 0 & 1 & 0 & 1 & 0 & 0 & 0 & 0 & 1 \\ 1 & 0 & 1 & 1 & 1 & 0 & 1 & 0 & 0 & 1 & 1 & 1 & 0 & 1 & 0 & 0 & 0 & 0 \\ 0 & 1 & 0 & 1 & 1 & 1 & 0 & 1 & 0 & 0 & 1 & 1 & 1 & 0 & 1 & 0 & 0 & 0 \\ 0 & 0 & 1 & 0 & 1 & 1 & 1 & 0 & 1 & 0 & 0 & 1 & 1 & 1 & 0 & 1 & 0 & 0 \\ 0 & 0 & 0 & 1 & 0 & 1 & 1 & 1 & 0 & 1 & 0 & 0 & 1 & 1 & 1 & 0 & 1 & 0 \\ 0 & 0 & 0 & 0 & 1 & 0 & 1 & 1 & 1 & 0 & 1 & 0 & 0 & 1 & 1 & 1 & 0 & 1 \\ 1 & 0 & 0 & 0 & 0 & 0 & 0 & 1 & 1 & 1 & 1 & 0 & 0 & 1 & 1 & 1 & 0 \\ 0 & 1 & 0 & 0 & 0 & 0 & 0 & 0 & 1 & 1 & 1 & 1 & 0 & 0 & 1 & 1 & 1 \\ 1 & 0 & 1 & 0 & 0 & 1 & 0 & 1 & 0 & 0 & 0 & 1 & 1 & 1 & 0 & 0 & 1 & 1 \\ 1 & 1 & 0 & 1 & 0 & 1 & 1 & 1 & 1 & 0 & 1 & 0 & 1 & 1 & 1 & 0 & 0 & 1 \\ 1 & 1 & 1 & 0 & 1 & 1 & 1 & 0 & 1 & 1 & 1 & 1 & 0 & 1 & 1 & 1 & 0 & 0 \\ 0 & 1 & 1 & 1 & 0 & 1 & 1 & 1 & 0 & 1 & 1 & 1 & 1 & 0 & 1 & 1 & 1 & 0 \\ 0 & 0 & 1 & 1 & 1 & 0 & 1 & 1 & 1 & 0 & 1 & 1 & 1 & 1 & 0 & 1 & 1 & 1 \\ 1 & 0 & 0 & 1 & 1 & 0 & 0 & 0 & 1 & 1 & 1 & 1 & 1 & 1 & 0 & 1 & 1 \\ 1 & 1 & 0 & 0 & 1 & 0 & 0 & 1 & 0 & 1 & 0 & 1 & 1 & 1 & 1 & 0 & 1 \end{pmatrix}$$

which can also be written in the form:

$X0,n+1=X0,n\^X1,n\^X2,n\^X4,n\^X6,n\^X7,n\^X8,n\^14,\ n\^X16,n\^X17,n$ to $X17,n+1=X0,n\^X1,n\^X4,n\^X7,n\^X9,n\^X11,n\^X12,\ n\^X13,n\^X14,n\^X15,n\^X17,n.$

An embodiment of the invention also preferably relates to a device for receiving scrambled data by means of at least one periodic scrambling sequence, organised into time intervals each including at least one bit period called a symbol. Such a device according to an embodiment of the invention thus advantageously includes means for synchronisation of the device themselves including means for calculating a synchronisation value of at least one generator polynomial of the scrambling sequence, by progression in the sequence, by jumps of at least one bit period.

The calculation means preferably implement a matrix calculation of the synchronisation value.

Advantageously, the calculation means comprise a first register including flip-flops delivering, at the output, the bits of the sequence enabling the synchronisation value to be obtained.

Preferably, the input of each flip-flop is connected to the output of a multiplexer controlled by a selection signal (SEL).

Also preferably, when the selection signal selects the input of the bottom of the multiplexer, the transfer matrix $M_X$ is applied, and when the selection signal selects the input of the top of the multiplexer, the transfer matrix $M_X^N$ is applied.

Advantageously, the receiving device according to an embodiment of the invention is applied to the fields belonging to the group including:
- the optimisation of step 3 of the UMTS cell searcher;
- the acceleration of the slewing process of a UMTS rake receiver;
- the optimisation of the operation of a UMTS equalizer;
- the precalculation of the initial value (or seed) of a linear feedback shift register.

The application of the method and device according to an embodiment of the invention is described in detail below.

An embodiment of the invention also relates to a mobile radiocommunication terminal including means for receiving scrambled data by means of at least one periodic scrambling sequence, and organised into time intervals each including at least one bit period called a symbol. Such a terminal thus preferably includes means for synchronisation of said receiving means including means for calculating a synchronisation value of at least one generator polynomial of the scrambling sequence, by progression in the sequence by jumps of at least one bit period, wherein the calculation means implement a matrix calculation of the synchronisation value.

Thus, an embodiment of the invention is based on an entirely novel and inventive approach to the quasi-direct determination of the synchronisation value (scrambling code)—given by a predetermined synchronisation time interval and synchronisation symbol—of at least one generator polynomial of a scrambling sequence, synchronisation value, with minimal processing.

An embodiment of the invention applies in particular, but not exclusively, to both the synchronisation of a UMTS Rake receiver and to the optimisation of processing step three of the UMTS cell searcher, both contained in a mobile radiocommunication terminal of the same type.

Other features and advantages will become clearer from the following description of a preferred embodiment, given by way of a simple illustrative and non-limiting example, and the appended drawings.

These various figures are described in detail in the remainder of this document, to support the description of various embodiments and applications proposed.

DETAILED DESCRIPTION OF THE ILLUSTRATIVE EMBODIMENTS

In this section, we first provide a description of an embodiment of the invention in the form of a matrix approach, applied to step three of the cell searcher. Other alternatives are also described in this section in the form of examples of applications of the method and device according to an embodiment of the invention.

A more concise description of an alternative of this embodiment will also be provided n a second part in the context of a UMTS rake receiver. Finally, a description of a possible technique for implementation of an embodiment of the invention will also be provided.

1. Summary of the Principle of Modulation/Demodulation of a UMTS Signal

The code sequence consists of N elements or symbols of the scrambling sequence, called "chips". It is noted here that this sequence of the code (constituted by N chips) is unique for a given user and that it constitutes the coding key of the signal received; it is saved if the data symbol is 1; otherwise, it is inverted. In addition, if L is the length of the code and each symbol has a duration noted Tb, there is then a chip every Tb/N seconds and the new modulated signal has a throughput N times greater than the signal initially sent by the user and will therefore use a frequency band N times wider.

It is also noted that, to recover the information contained in the signal received, the receiver must perform the same operation, i.e. generate the same spreading sequence and multiply it with the signal received; the data encoded by this sequence is then restored. The application of such a technique makes it possible in particular to reduce the noise level for the baseband signal: the greater the spread, the more the interferences are eliminated.

Thus, it is noted that during the decoding, the synchronisation consumes a significant amount of energy at the level of the receiver and imposes a notable processing time during which the message received cannot be processed.

2. Description of an Embodiment of the Invention in the Context of its Application in the UMTS Cell Searcher This involves the optimisation of step 3 of operation of the cell searcher corresponding to the correlation of the CPICH channel.

Figure 1:
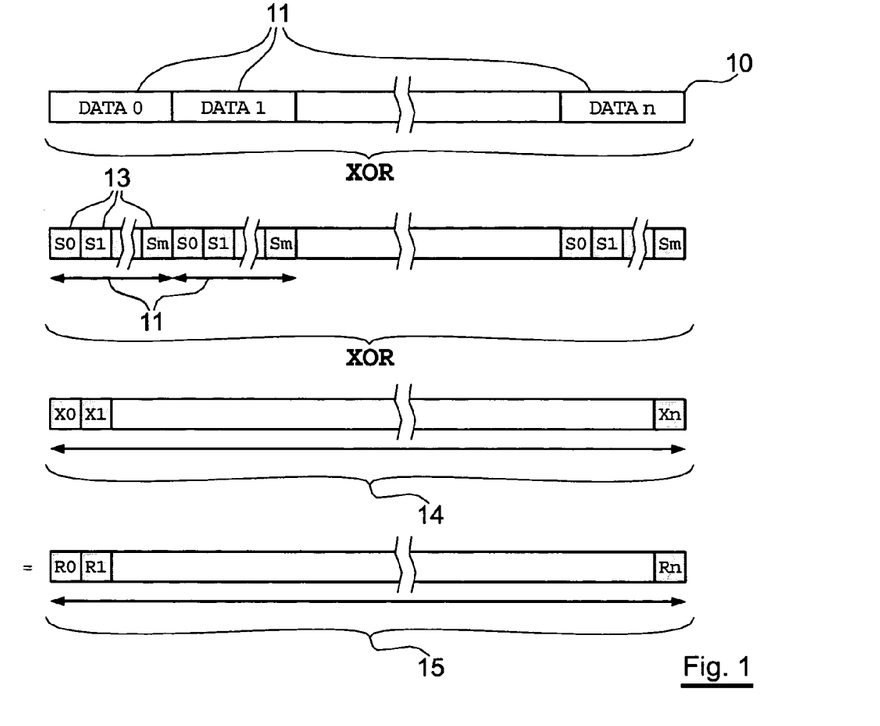
FIG. 1 shows a diagram of the data propagation and scrambling operation.

As shown in FIG. 1, each message transmitted is received in the form of a scrambling sequence (10) consisting of a set (11) of data sequences of the same size ($Data_0 \ldots Data_N$). Each of the data sequences (11) $Data_0 \ldots Data_N$ can be cut in the form of regular time intervals (12) themselves composed of N bit periods (13) (or symbols) $S_0$ to $S_m$.

In the context of UMTS, each sequence (11) of the scrambling code is composed of 38400 time intervals (12) to which the generator polynomial of the scrambling code is applied in order to obtain the values of the scrambling code (14) $X_0 \ldots X_N$, which then make it possible to recover the right values of the transmitted scrambled data $R_0 \ldots R_N$ (15), by applying the following formula: $R_i = Data_i$ XOR $S_i$ XOR $X_i$. Thus, by applying the same scrambling sequences at the transmission and reception, the recovery of noise is avoided, this being made possible when the initial starting time in the sequence received is known and the sequence of all of the symbols received is reinitialised.

However, due to the 38400 time intervals to be managed in the context of UMTS and the cell searcher, this is made much more complex and therefore justifies the implementation of the method according to an embodiment of the invention.

With the method according to an embodiment of the invention, also called "Turbo scrambling code", it is indeed possible to load the correct value of the "scrambling code", at the right time, at the level of the pseudorandom generator, with a maximum processing delay not exceeding 4 time intervals.

Figure 2:
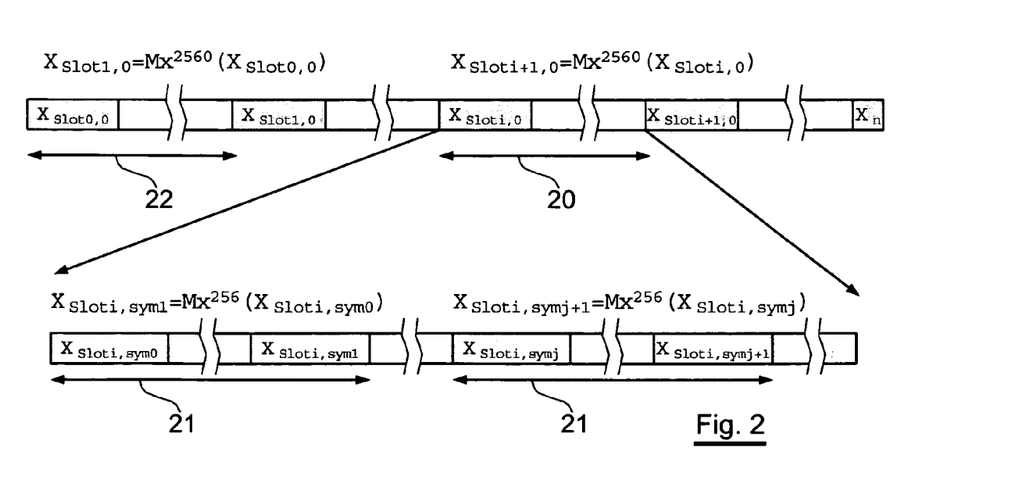
FIG. 2 shows the general implementation mechanism of the "Turbo scrambling", according to an embodiment of the invention.

Such a method is based on a matrix calculation making it possible to eliminate the generator polynomial, directly from a known first position, to a second position, which is also known and which is characteristic of the synchronisation value. This approach is shown in FIG. 2, which makes it possible to better visualise the principle according to an embodiment of the invention consisting of a succession of jumps on the time intervals until reaching the desired time interval, then performing as many symbol jumps as necessary in this time interval, until reaching the right symbol value, with the time interval and the symbol thus obtained being representative of the synchronisation time desired for initiating the descrambling of the received data sequence. However, the synchronisation value given by the association of a time interval reference and a symbol reference makes it necessary, in the context of processing operations applied to the cell searcher and the UMTS rake receiver, to precisely determine the references of the time intervals and CPICH symbols corresponding to this value.

This determination is made according to the following technique in the context of the cell searcher:

1) the generator polynomial is started up;
2) since the cell searcher has its own time counter (or timer), its position is never known, especially since the time reference that it use is not the same as that shared by the network. Therefore, in this second step, the cell searcher is allowed to determine itself the information concerning the synchronisation value resulting from operation steps 1 (search of the strongest transmitting station and determination of the PCH channel) and 2 (determination of the synchronisation on the SCH), which is then correlated with its own internal synchronisation.

After the aforementioned steps, step 3 of the cell searcher is launched so as to obtain the measurements on the CPICH channel.

The cell searcher is the first unit activated upon start-up of the mobile terminal. It therefore recovers the strongest transmitting station before performing its own synchronisation.

In the context of an embodiment of the invention, to cause the cell searcher to converge more quickly, instead of running the generator polynomial from point-to-point, the scrambling sequence is first cut into time intervals or frames, then symbols. For the cell searcher of the example of FIG. 2, for example, each time interval (20) or frame is cut into ten periods of 256 bits (21). This cutting is expressed in the form of frozen transfer matrices noted $M_X^{256}$ and $M_X^{2560}$, which correspond respectively to the symbol transfer matrix and the time interval transfer matrix.

The implementation of the "turbo scrambling" can therefore be performed easily by using an XOR table for each of the aforementioned frozen matrices. The desired correct time interval is then obtained by performing an iterative calculation from the starting interval (22) noted "slot0,0", by multiplying each time interval by the time interval transfer matrix $M_X^{2560}$:

$$X_{Slot1,0} = M_X^{2560} * X_{Slot0,0}, \ldots, X_{Slot(i+1),0} = M_X^{2560} * X_{Slot(i,0)}.$$

Once the correct time interval has been obtained, the right symbol value desired for recovering the synchronisation of the sequence transmitted is calculated from the starting symbol of the correct time interval obtained, by iterative multiplications with the symbol transfer matrix $M_X^{256}$, in the following way:

$$X_{Slot(i,symbole1)} = M_X^{256} * X_{Slot(i,symbole0)}, \ldots, X_{Slot(i,symbole j+1)} = M_X^{256} * X_{Slot(i,symbole j)}.$$

With this new matrix approach according to an embodiment of the invention, it is possible to converge more rapidly without having to run the generator polynomial time interval by time interval and symbol by symbol on each time interval.

For this UMTS cell searcher, each of the eighteen possible output bits of the registers are represented in the form of vectors forming the lines of the time interval transfer matrix $M_X^{2560}$ and the symbol transfer matrix $M_X^{256}$ for each time interval. The initial value is given by the value of the UMTS SEED. Thus, each following calculated vector gives the lag of the sequence received. For example, if there are 10 periods of 256 bits to go through by time interval as in the case of the cell searcher, we will find the correct value desired by applying the following calculations: $X_{Slot1,0} = M_X^{2560} * X_{Slot0,0}$, ..., $X_{Slot(i+1),0} = M_X^{2560} * X_{Slot(i,0)}$, then $X_{Slot(i,symbole1)} = M_X^{256} * X_{Slot(i,symbole0)}$, ..., $X_{Slot(i,symbole\ j+1)} = M_X^{256} * X_{Slot(i,\ symbole\ j)}$, to find the correct symbol.

Figure 3:
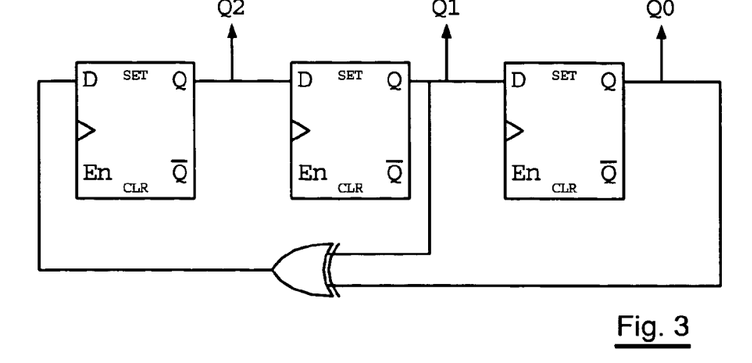
FIG. 3 shows a simple linear feedback shift register with 7 states.

3. Example of Application of an Embodiment of the Invention to the Precalculation of the Initial Value of a Simple Linear Feedback Shift Register with 7 States FIG. 3 shows a very simple linear feedback shift register LFSR, producing the following 7 successive states given by the flip-flops $Q_0$, $Q_1$ and $Q_2$, which deliver, at the output, the bits of said sequence making it possible to obtain said desired synchronisation value. It is assumed here that the initial state is given by $Q_2\ Q_1\ Q_0=001$:

| State 1 | State 2 | State 3 | State 4 | State 5 | State 6 | State 7 |
|---|---|---|---|---|---|---|
| 001 | 100 | 010 | 101 | 110 | 111 | 011 |

We shall call this sequence $S_1$ in which after state 7 "011", we loop back to the initial state "001". In this example, we are attempting to go through the sequence $S_1$ more quickly by skipping states and therefore producing a sequence $S_2$, while being capable of returning to sequence $S_1$ at any time.

In this configuration of the LFSR, we progress through the sequence with successive jumps from a first state to a second state, until the desired state is reached. In the example of FIG. 3, the movement from one state (n) to another state (n+1) is performed by applying the formula: $Q(n+1)=M \cdot Q(n)$ with M the matrix for transfer from a first state to a second state, M being written here:

$$M = \begin{bmatrix} 0 & 1 & 0 \\ 0 & 0 & 1 \\ 1 & 1 & 0 \end{bmatrix}$$

Figure 4:
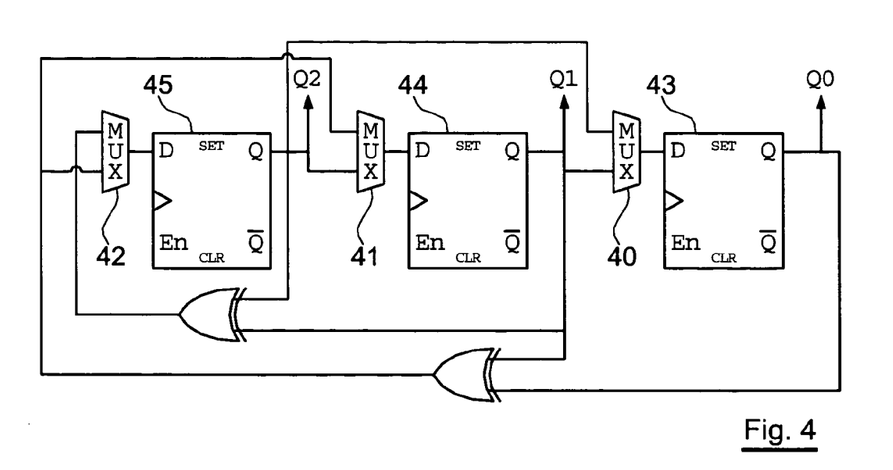
FIG. 4 shows the modifications made to the LFSR of FIG. 3 so as to accelerate the path in the sequence of its possible successive states.

To achieve this objective, the LFSR with 7 states of FIG. 3 is modified by adding three multiplexers (40, 41, 42) thereto, having a common signal SEL that can choose to connect the respective inputs of the flip-flops $Q_0$, $Q_1$ and $Q_2$, either at the input on the top or at the input on the bottom of said multiplexers, as shown in FIG. 4. The inputs (43, 44, 45) of each flip-flop $Q_0$, $Q_1$ and $Q_2$ are therefore respectively connected to the output of one of the multiplexers (40, 41, 42) and controlled by a selection signal (SEL).

Thus, if the signal SEL chooses the inputs at the bottom of the flip-flops, the configuration of FIG. 3 occurs, without optimisation of the path of sequence $S_1$. Conversely, if the input at the top is chosen, the new sequence $S_2$ is described and characterised by the following 7 new states:

| State 1' | State 2' | State 3' | State 4' | State 5' | State 6' | State 7' |
|---|---|---|---|---|---|---|
| 001 | 010 | 110 | 011 | 100 | 101 | 111 |

Figure 5:
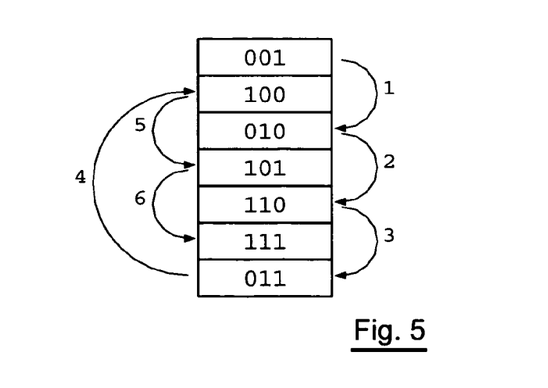
FIG. 5 provides on example of an optimised sequence allowing for a faster path of the sequence states of the LFSR of FIG. 3, resulting from the modifications made in FIG. 4.

It is then noted that the states of $S_2$ are obtained by going through those of $S_1$ by skipping one of every two states, as shown in FIG. 5, which provides a view of the successive chain in the sequence of the possible successive states of the LFSR, following the modifications of FIG. 4.

In this FIG. 5, it is then noted that to reach state 7'="111", rather than using the LFSR of FIG. 3, in which it is necessary to apply five clock cycles, it is now possible according to an embodiment of the invention to use the architecture of the LFSR of FIG. 4 in the following way:

1) SEL="select the inputs of the top" and reach state 3'="110" in two clock cycles, then
2) return to SEL="select the inputs of the bottom", then reach state 7'="111" in a single additional clock cycle;

which makes it possible to reach state 7'="111" in only 3 clock cycles.

In terms of the result, the method according to an embodiment of the invention thus makes it possible to reach a given state in half the time.

It is also important to emphasise the fact that the principle exemplified above can easily be generalised in order to perform larger jumps, and thus reach a state even more quickly, up to three, for or even N times more quickly. It simply involves an assessment of the relationship between the benefit of increasing speed and the additional cost of gates and multiplexers to be added to the architecture to be implemented.

4. Application of an Embodiment of the Invention to LFSRs of the Downlink Descrambler of a UMTS Receiver It is noted that the term downlink descrambler is used to refer to the two UMTS LFSRs "X" and "Y" used in a UMTS-type mobile terminal, in order to descramble the sequences of symbols received. The reader can refer to standard 3G-TS 25.213, paragraph 5.2.2, page 21 for additional details on these descramblers.

Case of LFSR-X Descrambler

In the case of the LFSR-X descrambler, we are attempting to optimise the number of clock cycles to be applied in order to reach the synchronisation value of the LFSR more quickly and with a minimum number of jumps between the possible states of the LFSR. We therefore apply the same approach as that described above, so as to allow for jumps between the states of the descrambling sequence, by a step of four states (for example). To achieve this objective, the matrix architecture of FIG. 6 is provided, in which eighteen multiplexers (610) to (628) are implemented, the outputs of which are connected to the inputs of the eighteen flip-flops referenced 0 to 17 in FIG. 6.

Figure 6:
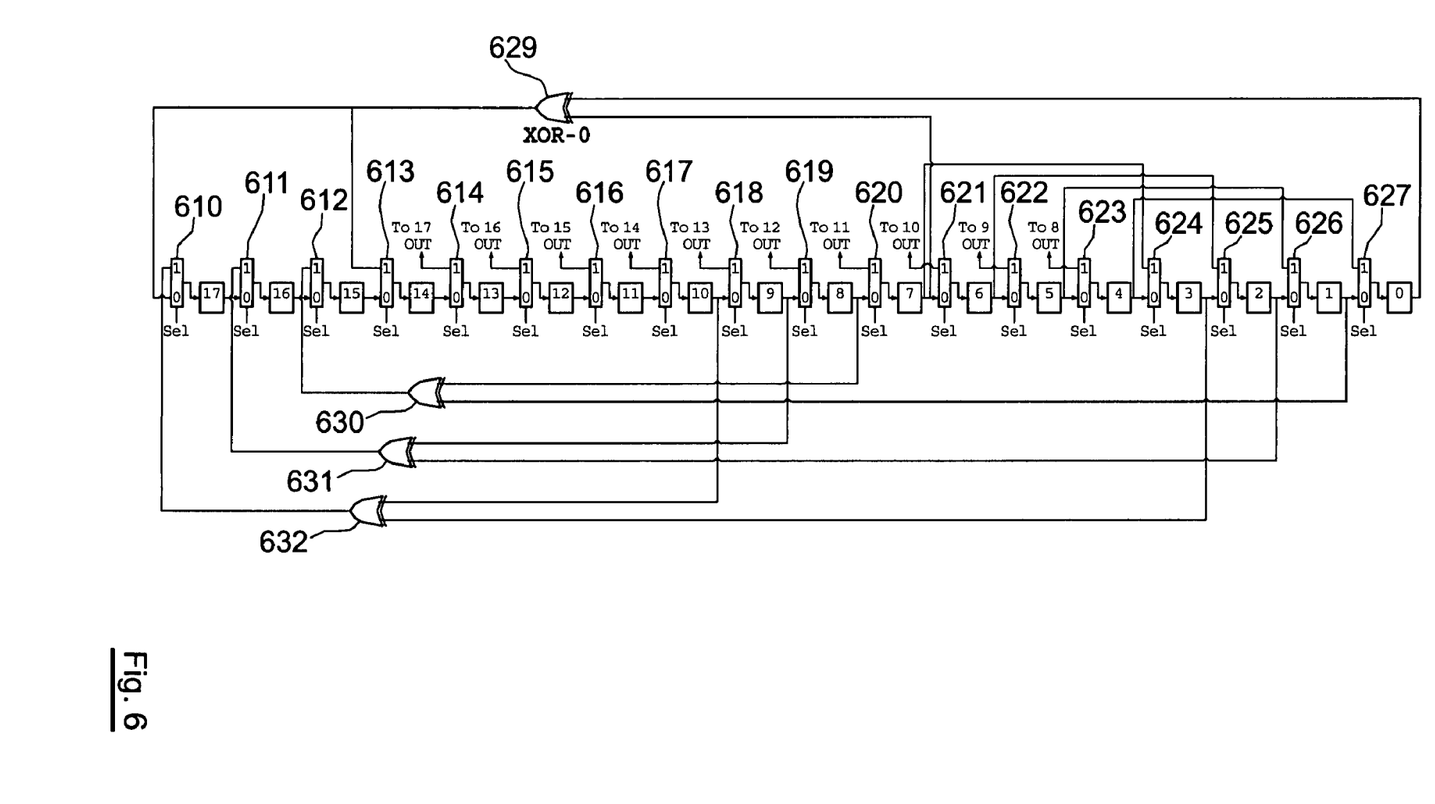
FIG. 6 shows an example of a modification made to a LFSR-X "downlink" descrambler enabling four-state jumps to be performed.

Thus, according to the architecture provided in FIG. 6, if a selection signal Sel="0" selects the inputs of the bottom of the eighteen (610) to (628) multiplexers of FIG. 6, we have the original architecture of the LFSR-X defined in paragraph 5.2.2 (page 21) of standard 3G-TS 25.213.

By contrast, according to the new architecture provided in FIG. 6, if a selection signal Sel="1" selects the inputs "1" of the top of the eighteen multiplexers (610) to (628), we then obtain new paths making it possible to go through the original sequence by steps of 4, owing to the new equivalence thus obtained between the selection signal at "1" not requiring more than one clock cycle and a selection signal at "0" requiring four clock cycles.

As an intermediate conclusion of this section, we note that with an additional cost of eighteen multiplexers (610) to (628) and three XORs (630), (631) and (632), we enhance the initial structure of the LFSR by an equivalent of "18 MUX+3 XOR= (18*4+3*4)=84" NAND2 gates, which thus make it possible to go through the $(2^{18}-1)$ possible states of the descrambling sequence four times faster than with the architecture normally implemented by the techniques of the prior art.

It is also very interesting to note that the method described below can of course be generalised to the downlink UMTS LFSR-X, which advantageously enables the following results to be obtained:

| Value of jump N | Additional hardware cost |
|---|---|
| N = 2 to N = 11 | 18 MUX + (N − 1) XOR = (18 + N − 1) * 4 = from 84 to 112 NAND2 gates |
| N = 12 to N = 18 | 18 MUX + 10 XOR + (N − 11) XOR3 = (18 + {10 + 2(N − 11)}XOR) = (18 + 10 + 2(N − 11)) × 4 = from 120 to 168 NAND2 gates. |

There are multiple benefits to the method according to an embodiment of the invention when it is applied to the LFSR:

first, it makes it possible to perform a hardware precalculation of a initial SEED value, i.e. a starting value of the calculations corresponding to a given scrambling code of a base station), without having to provide preloading multiplexers for the 18 D-FF. The 18 multiplexers used in the new architecture of FIG. 6, according to an embodiment of the invention, indeed make it possible to replace the eighteen preloading multiplexers normally used specifically for preloading the LFSR;

it also makes it possible, in a slewing process, to reach a predetermined state from a starting point (SEED value, for example), must more quickly and at the identical clock frequency.

The benefits and advantages thus obtained by the method of an embodiment of the invention, and in particular in terms of hardware implementation, are particularly significant and beneficial when we compare them with the method according to the prior art, i.e. the so-called mask method.

Indeed, in the mask method, if it is desirable to divide, by a factor of four, the jumps needed to reach a predetermined state of a scrambling sequence, it is necessary to drastically increase the complexity of the implementation of the hardware architecture. Indeed, it will be necessary, in order to increase by four the speed for recovering a synchronisation value, to enhance the hardware architecture with 102 NAND2 gates most often obtained in the following way: "17 XOR+17 AND=(17*4+17*2) NAND2=17*6=102 NAND2 gates". In addition, the complementary logic to be implemented in order to enable the loading of the optimal value of the mask and store the three or four different masks will have a notable cost with regard to NAND2 gates.

Finally, another important advantage of the architecture proposed in FIG. 6, which provides the possibility of implementing the method and device according to an embodiment of the invention in the context of a descrambler, in particular but not limited to the downlink UMTS-type, relates to the possibility of being capable of returning immediately and at any time to the architecture and operation of the original LFSR. Indeed, it is simply necessary to replace the selection signal Sel="0", as the 18-bit register is already then loaded with the desired state.

It is important to emphasise, in order to distinguish an embodiment of the invention from the methods of the prior art and in particular the mask method, that this result is also much more costly. Indeed, as the mask method makes it possible to extract only a single bit in each state, this means that it is necessary to count eighteen clock cycles in order to leave the state of the LFSR with a time interval shift, and therefore to save these eighteen bits in order to be capable of loading them into the eighteen D-FFs. However, a last step such as this would alone require eighteen multiplexers at the input of the eighteen DFFs, simply to load the eighteen bits into the LFSR.

Case of the LFSR-Y Descrambler

Figure 7:
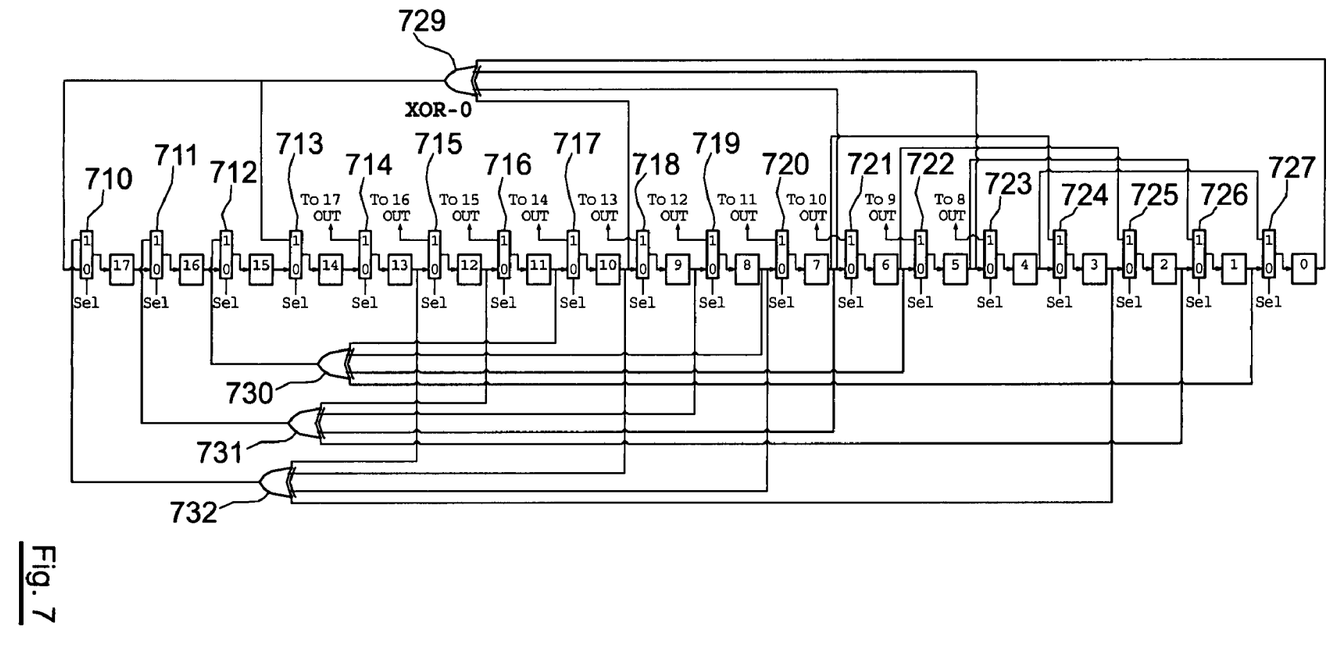
FIG. 7 provides an example of a hardware modification made to a LFSR-Y descrambler in order to be capable of performing four-state jumps.

FIG. 7 shows the modifications made to the architecture of a LFSR-Y descrambler in which it is also desirable to optimise the number of clock cycles to be applied so as to be capable also of performing four-state jumps and thus reaching the synchronisation value more quickly.

To reach the objective described above, an additional cost of 18 multiplexers (710) to (727) and three XORs (730), (731) and (732) of the XOR4-type is necessary and sufficient in order to achieve functioning equivalent to that of:

"(18MUX+3*3XOR)=(18+9)*4=27*4=108 NAND2 gates".

The same advantages of an embodiment of the invention as those mentioned in the previous section for the LFSR-X descrambler are obtained here for the LFSR-Y descrambler of FIG. 7.

5. Explanation of the Construction of the Hardware Architectures Implemented According to an Embodiment of the Invention by a Matrix Calculation Applied to the Structure of the Descrambler The objective of this section is to explain how the hardware architectures are constructed according to an embodiment of the invention in FIGS. 6 and 7 from a matrix calculation.

Let A be the transition matrix of the LFSR-X so that $\vec{x}_{k+1} = A \vec{x}_k$.

We then obtain:

$$A = \begin{pmatrix} 010\ldots 0 \\ 0010\ldots 0 \\ 00010\ldots 0 \\ \ldots 1 \ldots 0 \\ \cdot \quad \cdot \\ \cdot \quad \cdot \\ \cdot \quad \cdot \\ \cdot \quad \cdot \\ 100000010. \end{pmatrix}$$

18×18 matrix and the vector $$\vec{x}_k = \begin{pmatrix} x(0)_k \\ x(1)_k \\ \ldots \\ \ldots \\ x(17)_k \end{pmatrix}$$

This matrix A corresponds to the LFSR-X defined in standard 3G TS.25.213, section 5.2.2. Its hardware implementation is performed by means of the architecture of FIG. 8, which integrates eighteen flip-flops 810 to 827, all timed by the same clock.

The $i^{th}$ component of the vector $\vec{x}_k$, namely: $x(i)_k$ represents the value of the state of the $i^{th}$ flip-flop (FIG. 8), obtained after the execution of a number k of clock cycles. Each coordinate of this vector therefore has a value of either "0" or "1". Finally, the vector $\vec{x}_0$ is defined as:

$$\vec{x}_0 = \begin{pmatrix} 1 \\ 0 \\ \ldots \\ \ldots \\ 0 \end{pmatrix}$$

Figure 8:
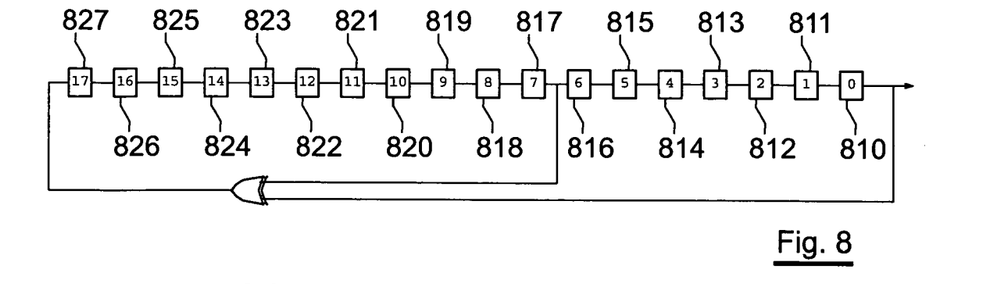
FIG. 8 provides an illustration of a LFSR-X defined in standard 3G TS25.213 with eighteen flip-flops D all timed by the same clock.

This means that the eighteen flip-flops (510) to (827) of FIG. 8 are initialised from left to right so that:

$$\vec{x}_0 = \begin{pmatrix} x(0)_0 \\ x(1)_0 \\ \ldots \\ \ldots \\ x(17)_0 \end{pmatrix} = \begin{pmatrix} 1 \\ 0 \\ 0 \\ 0 \\ 0 \end{pmatrix}$$

Thus, the principle of "N jumps" implemented according to an embodiment of the invention can be explained in matrix form by the following formula: $\vec{x}_{k+N} = A^N \vec{x}_k$, which is obtained by recursion from the general formula: $\vec{x}_{k+1} = A \cdot \vec{x}_k$.

For example, if we calculate matrix $A^4$, which corresponds to the example of a four-step jump, suggested above in the case of the LFSR-X and shown in FIG. 6, we obtain the following matrix:

$$A^4 = \begin{bmatrix} 0 & 0 & 0 & 0 & 1 & 0 & 0 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 & 0 & 0 \\ 0 & 0 & 0 & 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 0 & 0 & 0 & 0 & 0 & 0 & 1 \\ 1 & 0 & 0 & 0 & 0 & 0 & 0 & 1 & 0 & 0 & 0 & 0 & 0 & 0 & 0 & 0 & 0 & 0 \\ 0 & 1 & 0 & 0 & 0 & 0 & 0 & 0 & 1 & 0 & 0 & 0 & 0 & 0 & 0 & 0 & 0 & 0 \\ 0 & 0 & 1 & 0 & 0 & 0 & 0 & 0 & 0 & 1 & 0 & 0 & 0 & 0 & 0 & 0 & 0 & 0 \\ 0 & 0 & 0 & 1 & 0 & 0 & 0 & 0 & 0 & 0 & 1 & 0 & 0 & 0 & 0 & 0 & 0 & 0 \end{bmatrix}$$

We therefore deduce upon reading this transfer matrix, line by line, and by placing $\vec{x}_{k+4}$ at the left of this matrix and $\vec{x}_k$ at the right, that:

$$x(0)_{k+4} = x(4)_k$$

$$x(1)_{k+4} = x(5)_k$$

$$\ldots$$

$$x(13)_{k+4} = x(17)_k$$

$x(14)_{k+4} = x(0)_k + x(7)_k$ mod 2 (corresponding to the XOR-0 (629) of FIG. 6 and identical to the XOR (729) of FIG. 7.

$x(15)_{k+4} = x(1)_k + x(8)_k$ mod 2 (this is the XOR-1 (630) of FIG. 6).

$x(16)_{k+4} = x(2)_k + x(9)_k$ mod 2 (this is the XOR-2 (631) of FIG. 6).

$x(17)_{k+4} = x(3)_k + x(10)_k$ mod 2 (this is the XOR-3 (632) of FIG. 6).

The signs $<<=>>$ in these equations correspond to the multiplexers (610) to (627) of FIG. 6, for which the input of the top is selected by the selection signal Sel="1".

It is thus possible to conclude that, to reach a certain predetermined state, or a certain phase, of index P from another phase of index k, it is now enough simply to apply the formula: $\vec{x}_{k+P} = A^P \cdot \vec{x}_k$.

With the original LFSR, i.e. the LFSR of which the multiplexers would select the bottom input in the architecture of FIG. 6, for example, it would cost P clock cycles from state k to reach the desired state P+k.

If we implement the hardware architecture applying the method according to an embodiment of the invention, i.e. that in which the selection Sel="1" chooses the input of the top of the flip-flops, we can write: $P = j \cdot N + r$, where r is the remainder in the Euclidian division of P by N, and therefore: $\vec{x}_{k+P} = A^{j \cdot N + r} \vec{x}_k$, which is also equivalent to: $\vec{x}_{k+P} = (A^N)^j \cdot A^r \cdot \vec{x}_k$, which formula can also be broken down into:

$$\vec{x}_{k+Nj} = (A^N)^j \cdot x_k \qquad (1)$$

$$\vec{x}_{k+P} = A^r \cdot x_{k+Nj} \qquad (2)$$

Formula (1) indicates that j clock cycles are first carried out with the multiplexers of which the top input is selected (Sel="1"), then r clock cycles with the multiplexers of which the bottom input (Sel="0") is selected, which therefore means that a total of no more than j+r clock cycles are executed instead of N·j+r.

It can also be noted here that if we want to perform jumps by a step N, in the form $N=2^m$, the counting of clock cycles can advantageously be performed by shifting the sequence P by m bits to the right.

The results mentioned above can be applied identically to the case of the LFSR-Y descrambler, by adapting the transition matrix.

6. Other Applications of the Method and Device According to an Embodiment of the Invention Precalculation of SEED in LFSRs In consideration of standard 3GTS25.213, the benefit of performing jumps having a value N>1 in the sequences produced of the LFSRs primarily concerns the LFSR-X descramblers. Indeed, knowing the primary scrambling code of a transmitting base station, which is an integer between 0 and 511 and which can be noted here as "i", it is necessary to bring the LFSR-X to the phase: n=16*i by therefore executing 16*i clock cycles normally on the LFSR-X, from the initial known and predetermined state.

By the same mechanism according to an embodiment of the invention, it is possible to perform accelerated jumps defined by N state changes of the LFSR-X in a single clock cycle. Such an operation is performed in only: (n/N+r) clock cycles where (n/N) is the quotient of the Euclidian division of n by N and r is the remainder of this division. Thus, for example, if N=16, it is enough to perform 16*i/16=i clock cycles to reach the desired result.

It is also possible to emphasize the fact that such a calculation of the SEED value for the LFSR-X can be applied in one direction or the other to achieve a shift corresponding to the alternating left or right scrambling codes defined by standard 3GTS25.213.

Accelerated Slewing

Figure 9:
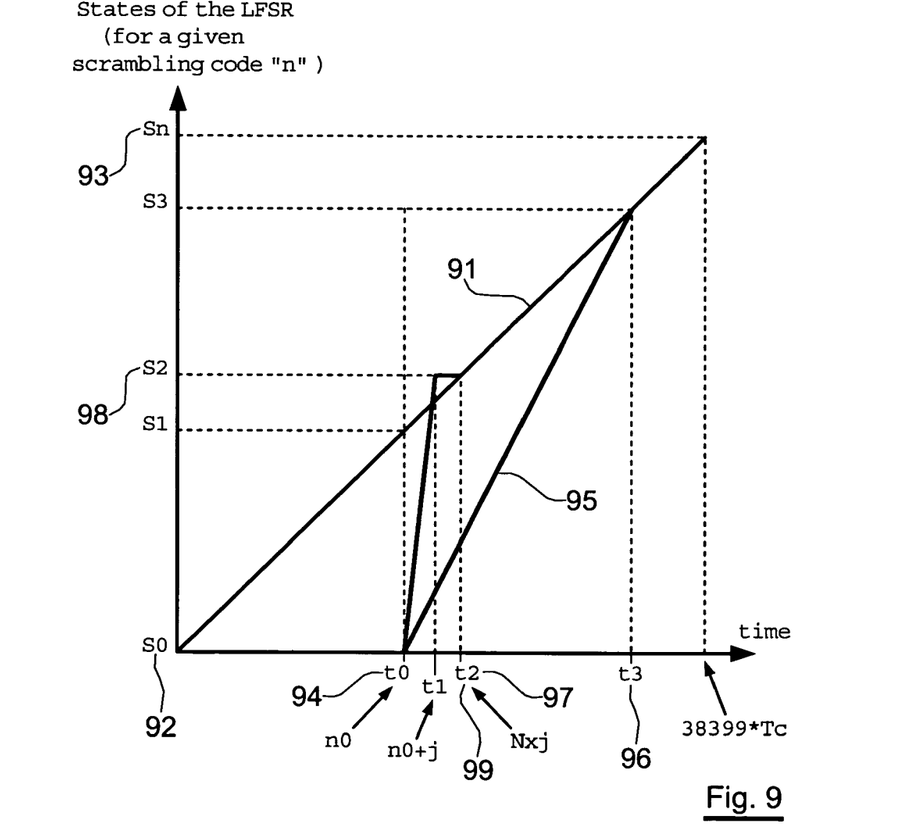
FIG. 9 shows the results of the application of the mechanism according to an embodiment of the invention for "accelerated slewing".

FIG. 9 shows the benefit of an embodiment of the invention for implementing an accelerated slewing process.

In this figure, the line 91 shows the change in the states of the LFSR used at the transmitting base station. Its change occurs over time Tc ("chip" time). Each transmitted data frame "goes through" the line 91 of a state $S_0$ referenced 92 up to a state $S_n$ referenced 93 in FIG. 9, then returns to $S_0$ after $S_n$.

The line 91 therefore shows the change in the phase of the signal received at each time. Thus, at $t_0$ (94), it is desirable to begin descrambling the signal received, which is not normally possible since it would be necessary in this case to bring the phase of the two LFSRs X and YU of the modem instantaneously to their respective states $S_1$. The slewing mechanism commonly known and used by the solutions of the prior art thus attempts to reach the line 91 of FIG. 9 via the line 95, but by accelerating the rate of the two LFSRs X and Y, for example by multiplying by eight the "chip" time Tc. According to the usual slewing technique, this approach then makes it possible to reach the line 91 at the time $t_3$ (96) and to be in phase at this time with the signal received.

With the LFSRs X and Y according to the an embodiment of invention, which can flip so as to perform jumps of N states per clock cycle, it is now possible to reach the phase of the signal received at the time $t_2$ (97) located well ahead on $t_3$ (96), in the following manner:

the LFSR-X is first initialised with the SEED value corresponding to the scrambling code of the transmitting base station of which the signal is to be demodulated by using the SEED precalculation method described above;

the two LFSRs X and Y then switch their multiplexers by flipping the selection signal Sel="1" to the inputs of the top of the flip-flops, which makes it possible to reach the state $S_2$ (98) of FIG. 9 by jumps of N time intervals. The number of clock cycles "j" to be applied then is thus determined: let no be the value of the counter of the time interval to be completed (which performs the modulo countings 38399 in the context of the UMTS) corresponding to the time $t_0$ (94). It is then enough to choose "j" so that j*N is greater than ($n_0$+j) and (j−1)*N is less than ($n_0$+j). By developing and solving these two inequalities, the choice of the value of "j" is determined so that:

$$\frac{n_0}{N-1} < j < \frac{n_0+N}{N-1}$$

Thus, having taken care to wire the LFSRs so that the jumps by a step N−1=$2^m$, the determination of "j" is performed by a simple shift, in the following way: $n_0$ is shifted by m bits to the right, and 1 is added.

Thus, from the time $t_2$ (99) of FIG. 9, the two LFSRs X and Y are re-flipped to their original configuration in which the selection signal Sel="0". These two LFSRs are then frozen (i.e. the flip-flops D of the LFSRs are not timed) for:
"N*j−($n_0$+j)=(N−1)*j−$n_0$" clock cycles which can only be positive (case of slewing by waiting).

In addition, once this number of clock cycles has been executed, we return to the point ($t_2$,$S_2$)—references 98 and 99 in FIG. 9. The two LFSRs X and Y are then always in a configuration characterised by a selection signal Sel="0". They are again timed and will generate the descrambling sequence in phase with the signal received (synchronisation), then enabling the demodulation of the signal received to be started much faster than with the solutions proposed in the known prior art.

We specify here that the choice of jumps by a step N−1=2 in no way contradicts the value of the jump by a step N=$2^m$, a requirement expressed above in the case of the precalculation of SEED. Indeed, the SEED calculation is not necessarily carried out in the same LFSR as that serving for the slewing. It is therefore perfectly possible to imagine that the SEED calculation of the example cited above is carried out in a cell searcher-type unit of a UMTS receiver for the jump value of jumps by a step N=$2^m$, and that the second calculation mentioned above (jumps by a step N−1=$2^m$) is applied to the RAKE of a UMTS receiver.

It simply involves making a careful choice making it possible to simplify the embodiment according to an embodiment of the invention, by taking for N or N−1 step values having the form $2^m$, in which it is necessary to perform the SEED precalculation or slewing.

Finally, it is specified that the methods and the device according to an embodiment of the invention, as well as their software and/or hardware implementation methods described above by way of a number of examples of applications, have numerous advantages, in particular by comparison with the mask method of the prior art solutions. All of these elements according to an embodiment of the invention make it possible in every case to accelerate the slewing forward by a factor N, and to precalculate the SEED values corresponding to given scrambling codes, without having to preload them beforehand and therefore make it necessary to provide and implement all of the logic necessary for executing such an operation.

One or more embodiments of the disclosure aim in particular to overcome one or more disadvantages of the prior art.

More specifically, an embodiment provides a generator making it possible to very quickly and even almost instantaneously obtain the desired synchronisation or convergence value at the level of the generator polynomial, while ensuring very low consumption, during the "slewing" process at the UMTS Rake receiver.

An embodiment makes it possible to suppress the delay, sometimes significant, normally encountered in the processing of step 3 of the UMTS "cell searcher" and thus suppress any risk of frame loss.

An embodiment provides such a generator that is of reduced complexity in particular in terms of the number of logic gates implemented with respect to the known techniques, and/or in terms of possibilities of use of algorithmic and/or software processing operations.

In other words, an embodiment is intended to provide a less complex alternative for reducing the waiting time, in particular when the generators are late, and thus promote the convergence of pseudorandom generators in a given state of a predetermined position to be achieved, which corresponds to the association of the synchronisation time interval and a synchronisation symbol, which are predetermined.

An embodiment proposes a technique that can be applied both to a UMTS Rake receiver so as to confer an instantaneous synchronisation capacity thereon, and to the optimisation of step 3 of operation of the "cell searcher", so that there is no longer a loss of time intervals during the correlation processing on the CPICH channel or any frame loss.

The invention claimed is:

1. A method for synchronising a device for receiving scrambled data, the method comprising:
   receiving scrambled data that has been scrambled by at least one periodic scrambling sequence organized into K time intervals, each including N periods of bits called symbols; and
   calculating a synchronization value of at least one generator polynomial of said scrambling sequence, in a predetermined synchronization time and synchronization bit period, wherein, in said calculation step, a matrix calculation of said synchronization value is implemented that operates successively:
      a jump of at least one time interval inside said sequence, in order to position on a desired time interval; and
      a jump of at least one bit period inside said desired time interval, in order to position on a desired bit period
   wherein said data is scrambled according to at least two scrambling sequences X and Y, wherein an initialization value for said sequence Y is set and an initialization value for said sequence X is characteristic of a device for transmission of said scrambled data, and wherein, to reach an index phase vector $(\beta+\mu)$ from an index phase vector $\beta$ of said scrambling sequence by successive jumps of value i, at least the following series of steps is carried out:
      breaking down the index value $\mu$ in the form of a sum of the quotient and the remainder r of the Euclidian division of $\mu$ by i, said quotient being expressed in the form of a product of an integer j with said jump value i;
      increasing to the integer power j said time interval transfer matrix of said sequence X, said time interval including ranges of i bit periods;
      multiplying said index phase vector $\beta$ by said time interval transfer matrix $(M_X^i)^j$, so as to obtain the value of said index phase vector $(\beta+i\times j)$, then;
      multiplying said index phase vector $(\beta+i\times j)$ by said bit period transfer matrix $(M_X^r)$, so as to be positioned on the correct bit period value;
   so as to be limited to a value of (j+r) the number of clock cycles to be applied in order to reach said desired index phase vector $(\beta+\mu)$.

2. Synchronisation method according to claim 1, wherein said matrix calculation implements a multiplication of a value for initialisation of said generator polynomial by at least one predetermined transfer matrix.

3. Synchronisation method according to claim 1, wherein progression through said sequence occurs by jumps of at least one time interval, by calculating the value of said generator polynomial at the boundaries of said intervals, up to said synchronisation time interval.

4. Synchronisation method according to claim 2, wherein said value of said generator polynomial at the boundaries of said time intervals is determined, from said initialisation value, by successive multiplications by a time interval transfer matrix.

5. Synchronisation method according to claim 3, wherein in said synchronisation time interval, progression through said sequence occurs by jumps of at least one period of N bits, by calculating the value of said generator polynomial at the boundaries of said bit periods, until the value of said synchronisation bit period is obtained.

6. Synchronisation method according to claim 3, wherein said value of said generator polynomial at the boundaries of said bit periods is determined, from said value of said generator polynomial at the boundaries of said intervals, by successive multiplications by a bit period transfer matrix.

7. Synchronisation method according to claim 1, wherein, as said periodic scrambling sequence is organised into K time intervals each including N bit periods,
   said symbol transfer matrix for said sequence X is the matrix $(M_X^K)^N$
   and said time interval transfer matrix for said sequence X is the matrix $M_X^K$.

8. Synchronisation method according to claim 1, wherein, as said periodic scrambling sequence is organised into K time intervals each including N bit periods,
   said symbol transfer matrix for said sequence Y is the matrix $M_Y^N$; and
   said value of said generator polynomial at the boundaries of said intervals for said sequence Y is determined from a table of vectors associated with said generator polynomial of said sequence Y.

9. Synchronisation method according to claim 1, wherein said successive jumps of bit periods have a value expressed in the form of a power of two.

10. Synchronisation method according to claim 1, wherein said synchronisation method implements the UMTS ("Universal Mobile Telecommunications System") system and said bit periods are CPICH symbols.

11. Synchronisation method according to claim 10, wherein said receiving device includes at least one RAKE receiver and cell searching means of the Cell searcher-type.

12. Synchronisation method according to claim 10, wherein as said bit periods are CPICH symbols, each of said time intervals includes K=10 periods of N=256 bits, so as to obtain a finer granularity.

13. Synchronisation method according to claim 12, wherein said bit period transfer matrix for said sequence X is the matrix:

$$Mx^{256} = \begin{pmatrix} 0 & 0 & 0 & 1 & 1 & 0 & 0 & 1 & 1 & 0 & 0 & 0 & 0 & 0 & 0 & 0 & 0 & 0 \\ 0 & 0 & 0 & 0 & 1 & 1 & 0 & 0 & 1 & 1 & 0 & 0 & 0 & 0 & 0 & 0 & 0 & 0 \\ 0 & 0 & 0 & 0 & 0 & 1 & 1 & 0 & 0 & 1 & 1 & 0 & 0 & 0 & 0 & 0 & 0 & 0 \\ 0 & 0 & 0 & 0 & 0 & 0 & 1 & 1 & 0 & 0 & 1 & 1 & 0 & 0 & 0 & 0 & 0 & 0 \\ 0 & 0 & 0 & 0 & 0 & 0 & 0 & 1 & 1 & 0 & 0 & 1 & 1 & 0 & 0 & 0 & 0 & 0 \\ 0 & 0 & 0 & 0 & 0 & 0 & 0 & 0 & 1 & 1 & 0 & 0 & 1 & 1 & 0 & 0 & 0 & 0 \\ 0 & 0 & 0 & 0 & 0 & 0 & 0 & 0 & 0 & 1 & 1 & 0 & 0 & 1 & 1 & 0 & 0 & 0 \\ 0 & 0 & 0 & 0 & 0 & 0 & 0 & 0 & 0 & 0 & 1 & 1 & 0 & 0 & 1 & 1 & 0 & 0 \\ 0 & 0 & 0 & 0 & 0 & 0 & 0 & 0 & 0 & 0 & 0 & 1 & 1 & 0 & 0 & 1 & 1 & 0 \\ 0 & 0 & 0 & 0 & 0 & 0 & 0 & 0 & 0 & 0 & 0 & 0 & 1 & 1 & 0 & 0 & 1 & 1 \\ 1 & 0 & 0 & 0 & 0 & 0 & 0 & 1 & 0 & 0 & 0 & 0 & 0 & 1 & 1 & 0 & 0 & 1 \\ 1 & 1 & 0 & 0 & 0 & 0 & 0 & 1 & 1 & 0 & 0 & 0 & 0 & 0 & 1 & 1 & 0 & 0 \\ 0 & 1 & 1 & 0 & 0 & 0 & 0 & 0 & 1 & 1 & 0 & 0 & 0 & 0 & 0 & 1 & 1 & 0 \\ 0 & 0 & 1 & 1 & 0 & 0 & 0 & 0 & 0 & 1 & 1 & 0 & 0 & 0 & 0 & 0 & 1 & 1 \\ 1 & 0 & 0 & 1 & 1 & 0 & 0 & 1 & 0 & 0 & 1 & 1 & 0 & 0 & 0 & 0 & 0 & 1 \\ 1 & 1 & 0 & 0 & 1 & 1 & 0 & 1 & 1 & 0 & 0 & 1 & 1 & 0 & 0 & 0 & 0 & 0 \\ 0 & 1 & 1 & 0 & 0 & 1 & 1 & 0 & 1 & 1 & 0 & 0 & 1 & 1 & 0 & 0 & 0 & 0 \\ 0 & 0 & 1 & 1 & 0 & 0 & 1 & 1 & 0 & 1 & 1 & 0 & 0 & 1 & 1 & 0 & 0 & 0 \end{pmatrix}$$

which can also be written in the form $X0,n+1=X3,n\char`\^X4,n\char`\^X7,n\char`\^X8,n$ to $X17,n+1=X2,n\char`\^X3,n\char`\^X6,n\char`\^X7,n\char`\^X9,n\char`\^X10,n\char`\^X13,n\char`\^X14,n$ and said time interval transfer matrix for said sequence X is the matrix:

$Mx^{2560} =$ $$\begin{pmatrix} 0 & 1 & 1 & 1 & 1 & 1 & 1 & 0 & 1 & 1 & 0 & 1 & 1 & 0 & 0 & 1 & 1 \\ 1 & 0 & 1 & 1 & 1 & 1 & 1 & 0 & 1 & 0 & 1 & 1 & 0 & 1 & 1 & 0 & 0 & 1 \\ 1 & 1 & 0 & 1 & 1 & 1 & 1 & 0 & 0 & 1 & 0 & 1 & 1 & 0 & 1 & 1 & 0 & 0 \\ 0 & 1 & 1 & 0 & 1 & 1 & 1 & 1 & 0 & 0 & 1 & 0 & 1 & 1 & 0 & 1 & 1 & 0 \\ 0 & 0 & 1 & 1 & 0 & 1 & 1 & 1 & 1 & 0 & 0 & 1 & 0 & 1 & 1 & 0 & 1 & 1 \\ 1 & 0 & 0 & 1 & 1 & 0 & 1 & 0 & 1 & 1 & 0 & 0 & 1 & 0 & 1 & 1 & 0 & 1 \\ 1 & 1 & 0 & 0 & 1 & 1 & 0 & 0 & 0 & 1 & 1 & 0 & 0 & 1 & 0 & 1 & 1 & 0 \\ 0 & 1 & 1 & 0 & 0 & 1 & 1 & 0 & 0 & 0 & 1 & 1 & 0 & 0 & 1 & 0 & 1 & 1 \\ 1 & 0 & 1 & 1 & 0 & 0 & 1 & 0 & 0 & 0 & 0 & 1 & 1 & 0 & 0 & 1 & 0 & 1 \\ 1 & 1 & 0 & 1 & 1 & 0 & 0 & 0 & 0 & 0 & 0 & 0 & 1 & 1 & 0 & 0 & 1 & 0 \\ 0 & 1 & 1 & 0 & 1 & 1 & 0 & 0 & 0 & 0 & 0 & 0 & 0 & 1 & 1 & 0 & 0 & 1 \\ 1 & 0 & 1 & 1 & 0 & 1 & 1 & 0 & 0 & 0 & 0 & 0 & 0 & 0 & 1 & 1 & 0 & 0 \\ 0 & 1 & 0 & 1 & 1 & 0 & 1 & 1 & 0 & 0 & 0 & 0 & 0 & 0 & 0 & 1 & 1 & 0 \\ 0 & 0 & 1 & 0 & 1 & 1 & 0 & 1 & 1 & 0 & 0 & 0 & 0 & 0 & 0 & 0 & 1 & 1 \\ 1 & 0 & 0 & 1 & 0 & 1 & 1 & 1 & 1 & 1 & 0 & 0 & 0 & 0 & 0 & 0 & 0 & 1 \\ 1 & 1 & 0 & 0 & 1 & 0 & 1 & 0 & 1 & 1 & 1 & 0 & 0 & 0 & 0 & 0 & 0 & 0 \\ 0 & 1 & 1 & 0 & 0 & 1 & 0 & 1 & 0 & 1 & 1 & 1 & 0 & 0 & 0 & 0 & 0 & 0 \\ 0 & 0 & 1 & 1 & 0 & 0 & 1 & 0 & 1 & 0 & 1 & 1 & 1 & 0 & 0 & 0 & 0 & 0 \end{pmatrix}$$

which can also be written in the form:

$X0,n+1 = X_{1,n} \char`\^ X_{2,n} \char`\^ X_{3,n} \char`\^ X_{4,n} \char`\^ X_{5,n} \char`\^ X_{6,n} \char`\^ X_{7,n} \char`\^ X_{9,n} \char`\^ X_{10,n} \char`\^ X_{12,n} \char`\^ X_{13,n} \char`\^ X_{16,n} \char`\^ X_{17,n}$ to $X17,n+1 = X_{2,n} \char`\^ X_{3,n} \char`\^ X_{6,n} \char`\^ X_{8,n} \char`\^ X_{10,n} \char`\^ X_{11,n} \char`\^ X_{12,n} \char`\^ X_{13,n}$ said bit period transfer matrix for said sequence Y then being the matrix:

$X17, n+1 = X2, n \char`\^ X3, n \char`\^ X6, n \char`\^ X7, n \char`\^ X9, n \char`\^ X10, n \char`\^ X13, n \char`\^ X14, n$ $$My^{256} = \begin{pmatrix} 1 & 1 & 1 & 0 & 1 & 0 & 1 & 1 & 0 & 0 & 0 & 0 & 1 & 0 & 1 & 1 \\ 1 & 1 & 1 & 1 & 0 & 0 & 0 & 0 & 1 & 1 & 1 & 0 & 0 & 0 & 0 & 1 & 0 & 1 \\ 1 & 1 & 1 & 1 & 1 & 1 & 0 & 1 & 0 & 1 & 0 & 1 & 0 & 0 & 0 & 0 & 1 & 0 \\ 0 & 1 & 1 & 1 & 1 & 1 & 1 & 0 & 1 & 0 & 1 & 0 & 1 & 0 & 0 & 0 & 0 & 1 \\ 1 & 0 & 1 & 1 & 1 & 0 & 1 & 0 & 0 & 1 & 1 & 1 & 0 & 1 & 0 & 0 & 0 & 0 \\ 0 & 1 & 0 & 1 & 1 & 1 & 0 & 1 & 0 & 0 & 1 & 1 & 1 & 0 & 1 & 0 & 0 & 0 \\ 0 & 0 & 1 & 0 & 1 & 1 & 1 & 0 & 1 & 0 & 0 & 1 & 1 & 1 & 0 & 1 & 0 & 0 \\ 0 & 0 & 0 & 1 & 0 & 1 & 1 & 1 & 0 & 1 & 0 & 0 & 1 & 1 & 1 & 0 & 1 & 0 \\ 0 & 0 & 0 & 0 & 1 & 0 & 1 & 1 & 1 & 0 & 1 & 0 & 0 & 1 & 1 & 1 & 0 & 1 \\ 1 & 0 & 0 & 0 & 0 & 0 & 0 & 1 & 1 & 1 & 1 & 0 & 0 & 1 & 1 & 1 & 0 \\ 0 & 1 & 0 & 0 & 0 & 0 & 0 & 0 & 1 & 1 & 1 & 1 & 0 & 0 & 1 & 1 & 1 \\ 1 & 0 & 1 & 0 & 0 & 1 & 0 & 1 & 0 & 0 & 0 & 1 & 1 & 1 & 0 & 0 & 1 & 1 \\ 1 & 1 & 0 & 1 & 0 & 1 & 1 & 1 & 0 & 1 & 0 & 1 & 1 & 1 & 0 & 0 & 0 & 1 \\ 1 & 1 & 1 & 0 & 1 & 1 & 1 & 0 & 1 & 1 & 1 & 1 & 0 & 1 & 1 & 1 & 0 & 0 \\ 0 & 1 & 1 & 1 & 0 & 1 & 1 & 1 & 0 & 1 & 1 & 1 & 1 & 0 & 1 & 1 & 1 & 0 \\ 0 & 0 & 1 & 1 & 1 & 0 & 1 & 1 & 1 & 0 & 1 & 1 & 1 & 1 & 0 & 1 & 1 & 1 \\ 1 & 0 & 0 & 1 & 1 & 0 & 0 & 0 & 1 & 1 & 1 & 1 & 1 & 1 & 0 & 1 & 1 \\ 1 & 1 & 0 & 0 & 1 & 0 & 0 & 1 & 0 & 1 & 0 & 1 & 1 & 1 & 1 & 1 & 0 & 1 \end{pmatrix}$$

which can also be written in the form:

$X0,n+1 = X_{0,n} \char`\^ X_{1,n} \char`\^ X_{2,n} \char`\^ X_{4,n} \char`\^ X_{6,n} \char`\^ X_{7,n} \char`\^ X_{8,n} \char`\^ X_{14,n} \char`\^ X_{16,n} \char`\^ X_{17,n}$ to $X17,n+1 = X_{0,n} \char`\^ X_{1,n} \char`\^ X_{4,n} \char`\^ X_{7,n} \char`\^ X_{9,n} \char`\^ X_{11,n} \char`\^ X_{12,n} \char`\^ X_{13,n} \char`\^ X_{14,n} \char`\^ X_{15,n} \char`\^ X_{17,n}$.

14. Device for receiving scrambled data that has been scrambled by at least one periodic scrambling sequence, and organised into time intervals each including at least one bit period called a symbol, wherein the device comprises:
a synchroniser comprising a calculator, which calculates a value for synchronisation of at least one generator polynomial of said scrambling sequence, by implementing a matrix calculation of said synchronisation value that operates successively:
a jump of at least one time interval inside said sequence, in order to position on a desired time interval; and
a jump of at least one bit period inside said desired time interval, in order to position on a desired bit period,
wherein said data is scrambled according to at least two scrambling sequences X and Y, wherein an initialization value for said sequence Y is set and an initialization value for said sequence X is characteristic of a device for transmission of said scrambled data, and wherein, to reach an index phase vector ($\beta+\mu$) from an index phase vector $\beta$ of said scrambling sequence by successive jumps of value i, at least the following series of steps is carried out:
breaking down the index value $\mu$ in the form of a sum of the quotient and the remainder r of the Euclidian division of $\mu$ by i, said quotient being expressed in the form of a product of an integer j with said jump value i;
increasing to the integer power j said time interval transfer matrix of said sequence X, said time interval including ranges of i bit periods;
multiplying said index phase vector $\beta$ by said time interval transfer matrix $(M_X^i)^j$, so as to obtain the value of said index phase vector ($\beta+i\times j$), then;
multiplying said index phase vector ($\beta+i\times j$) by said bit period transfer matrix $(M_X^r)$, so as to be positioned on the correct bit period value;
so as to be limited to a value of (j+r) the number of clock cycles to be applied in order to reach said desired index phase vector ($\beta+\mu$).

15. Receiving device according to claim 14, wherein said calculator comprises a first register including flip-flops delivering, at the output, the bits of said sequence enabling said synchronisation value to be obtained.

16. Receiving device according to claim 15, wherein the input of each flip-flop is connected to the output of a multiplexer controlled by a selection signal (SEL).

17. Receiving device according to claim 16, wherein when said selection signal selects the input of a bottom of said multiplexer, a transfer matrix $M_X$ is applied, and when said selection signal selects the input of a top of said multiplexer, a transfer matrix $M_X^N$ is applied.

18. Receiving device according to claim 14, wherein it is applied to the fields belonging to the group including:
the acceleration of the slewing process of a UMTS rake receiver;
the optimisation of the operation of a UMTS equalizer;
the precalculation of the initial value (or seed) of a linear feedback shift register (or LSFR).

19. Mobile radiocommunication terminal comprising:
means for receiving scrambled data by means of at least one periodic scrambling sequence, and organised into time intervals (frames) each including at least one bit period called a symbol; and
means for synchronisation of said receiving means including means for calculating a synchronisation value of at least one generator polynomial of said scrambling sequence, by implementing a matrix calculation of said synchronisation value that operates successively:

a jump of at least one time interval inside said sequence, in order to position on a desired time interval; and a jump of at least one bit period inside said desired time interval, in order to position on a desired bit period, wherein said data is scrambled according to at least two scrambling sequences X and Y, wherein an initialization value for said sequence Y is set and an initialization value for said sequence X is characteristic of a device for transmission of said scrambled data, and wherein, to reach an index phase vector $(\beta+\mu)$ from an index phase vector $\beta$ of said scrambling sequence by successive jumps of value i, at least the following series of steps is carried out:

breaking down the index value $\mu$ in the form of a sum of the quotient and the remainder r of the Euclidian division of $\mu$ by i, said quotient being expressed in the form of a product of an integer j with said jump value i;

increasing to the integer power j said time interval transfer matrix of said sequence X, said time interval including ranges of i bit periods;

multiplying said index phase vector $\beta$ by said time interval transfer matrix $(M_X^i)^j$, so as to obtain the value of said index phase vector $(\beta+i\times j)$, then;

multiplying said index phase vector $(\beta+i\times j)$ by said bit period transfer matrix $(M_X^r)$ so as to be positioned on the correct bit period value;

so as to be limited to a value of (j+r) the number of clock cycles to be applied in order to reach said desired index phase vector $(\beta+\mu)$.

* * * * *